(12) United States Patent
Andersen

(10) Patent No.: US 10,184,161 B2
(45) Date of Patent: Jan. 22, 2019

(54) TIRE RASP BLADE

(71) Applicant: B & J ROCKET SALES AG, Baar (CH)

(72) Inventor: Bent Toft Andersen, Tarm (DK)

(73) Assignee: B & J Rocket Sales AG, Baar (CH)

( * ) Notice: Subject to any disclaimer, the term of this patent is extended or adjusted under 35 U.S.C. 154(b) by 0 days.

(21) Appl. No.: 15/321,298

(22) PCT Filed: Jun. 22, 2015

(86) PCT No.: PCT/EP2015/063959
§ 371 (c)(1),
(2) Date: Dec. 22, 2016

(87) PCT Pub. No.: WO2015/197547
PCT Pub. Date: Dec. 30, 2015

(65) Prior Publication Data
US 2017/0159147 A1    Jun. 8, 2017

(30) Foreign Application Priority Data
Jun. 24, 2014 (EP) .................................. 14176320

(51) Int. Cl.
*B23D 71/02* (2006.01)
*B23D 1/18* (2006.01)
(Continued)

(52) U.S. Cl.
CPC ............. *C21D 9/22* (2013.01); *B23D 71/02* (2013.01); *B23D 71/025* (2013.01); *C21D 1/18* (2013.01);
(Continued)

(58) Field of Classification Search
CPC .......... B23D 71/025; C21D 1/18; C21D 1/42; C21D 11/005
See application file for complete search history.

(56) References Cited

U.S. PATENT DOCUMENTS 3,615,309 A * 10/1971 Dawson ............... B23D 61/127
451/540
3,879,825 A * 4/1975 Jensen .................. B23D 71/02
29/90.01
(Continued)

FOREIGN PATENT DOCUMENTS

CN    1181114 A    5/1998
EP    0640423 A1   3/1995
(Continued)

OTHER PUBLICATIONS

Davis, J.R.: "Heat treating of steel": ASM Handbook; ASM International; 1991; pp. 184-185.
(Continued)

*Primary Examiner* — Sara Addisu
(74) *Attorney, Agent, or Firm* — Mollborn Patents, Inc.; Fredrik Mollborn

(57) ABSTRACT

A method for producing a tire rasp blade for mounting on a rasp hub is described. The tire rasp blade has a blade body and blade teeth. A main part of the tire rasp blade is austenitized by heating the main part to an austenitization temperature. The tire rasp blade is then tempered. The austenitizing process is performed by induction heating the tire rasp blade until the austenitization temperature is reached. The austenitizing process is followed by a quenching process, wherein the quenching is started before austenitization temperature is reached, whereby the quenching process briefly overlaps the induction heating. A tire rasp blade is also described.

8 Claims, 3 Drawing Sheets

(51) Int. Cl.
*C21D 9/22* (2006.01)
*C21D 1/42* (2006.01)
*C21D 1/18* (2006.01)
C21D 11/00 (2006.01)

(52) U.S. Cl.
CPC .............. *C21D 1/42* (2013.01); *C21D 11/005* (2013.01); *Y02P 10/253* (2015.11)

(56) References Cited

U.S. PATENT DOCUMENTS

| | | | | |
|---|---|---|---|---|
| 5,033,175 | A | * | 7/1991 | Jensen .................. B23D 71/025 407/29.12 |
| 2009/0035602 | A1 | * | 2/2009 | Urushihara ............. B21C 37/04 428/639 |
| 2014/0272448 | A1 | * | 9/2014 | Valdez .................... C21D 8/10 428/592 |

FOREIGN PATENT DOCUMENTS

| | | | |
|---|---|---|---|
| SU | 559975 | A1 * | 5/1977 |
| SU | 817079 | A1 * | 3/1981 |

OTHER PUBLICATIONS

International Preliminary Examining Authority: "Written Opinion of the International Preliminary Examining Authority"; International application No. PCT/EP2015/063959; dated Jun. 6, 2016; 5 pp.
International Searching Authority: "Notification of Transmitial of the International Search Report and the Writien Opinion of the International Searching Authority, or the Declaration"; International application No. PCT/EP2015/063959; dated Sep. 24, 2015; 11 pp.
Zinn, Stanley: "Quenching for Induction Heating Basics of Quenching"; Induction Consultants; Rochester, NY; 2010; 6 pp.

* cited by examiner

TIRE RASP BLADE

A tire rasp blade, a rasp hub comprising a tire rasp blade and a method for producing a tire rasp blade.

FIELD OF THE INVENTION

The present invention relates to a method for producing a tire rasp blade. The invention further relates to a tire rasp blade produced by such method and a rasp hub comprising a tire rasp blade.

BACKGROUND

Tire buffing machines are well known in the tire retreading industry. Conventionally, a tire buffing machine includes both a structure for mounting a used tire and a rasp hub which removes the worn tread from the used tire prior to the retreading process. The used tire is rotated while being held against the rapidly rotating rasp hub whose outer perimeter is provided with plural tire rasp blades. When engaged against the used tire, the rasp blades cut or shear small segments of rubber from the worn tread surface area of the tire. In this way, the tire is "buffed" to remove the unwanted used tread and to provide the tire with an evenly textured surface suitable for retreading.

Tire rasp blades, together with interleaved spacers, are assembled on the periphery of the rasp hub between the hub front and back plates. The back plate is typically provided with plural axially directed support pins for mounting the rasp blades and spacers between the spaced front and back plates. Then, the front plate is placed on the support pins against the assembled blades and spacers and locked into place. Typically, rasp hubs are comprised of four stacked blade sections (wherein each section occupies a 90 degree circumferential segment), five stacked blade sections (wherein each section occupies a 72 degree circumferential segment), or six stacked blade sections (wherein each section occupies a 60 degree segment). Thus, each section of the assembled rasp blades is comprised of alternating blades and spacers arranged side-by-side. Furthermore, each section of blades and spacers are angled, or offset, relative to a plane perpendicular to the axis of rotation of the hub to form a cut angle, so that each blade in rotation has an axial cutting swath greater than the width of the blade. The width of a cut swath depends on the cut angle.

During operation, the toothed blades rotating at high speed come into contact and remove the old tread surface of a revolving tire by the cutting and abrading action of the rasp blades. However, this high-speed frictional interaction causes an increase in temperature of the rasp blades. Prolonged exposure to high temperature causes a weakening of the blades and increases the likelihood of blade failure. Typically, blade failure involves breaking off of its teeth or breaking of the blade body, particularly a portion of the body located adjacent an end of the blade. The likelihood of a substantial increase in the temperature of the rasp hub and, in particular, the blades disposed thereon is increased by the generally closed structure of the rasp hub with the blades and spacers disposed around the outer periphery of the hub in a tight-fitting arrangement.

In order to enhance the material properties of a rasp blade after shaping, it is well known to perform an austenitising process, wherein the blade is heated to a temperature above an austenitisation temperature, then the temperature is lowered very fast (quenching), and finally a tempering process is performed wherein the rasp blade is reheated to a tempering temperature. In known solutions, the austenitising process is performed by spreading rasp blade in a layer in an oven and heating the rasp blade for several minutes ensuring that the austenitisation temperature is reached. This austenitisation temperature depends on the material, but could be 880 degrees Celsius.

Even though the above-described enhancement process is performed, the blades are still being worn quite rapidly, and it is an object of the present invention to further improve the durability of the rasp blade.

GENERAL DESCRIPTION

In accordance with the invention, a method is provided for treating a shaped tire rasp blade for mounting on a rasp hub, said tire rasp blade comprising a blade body and blade teeth, wherein the method comprises an austenitising process for austenitising the main part of the tire rasp blade by heating it to an austenitisation temperature, a subsequent quenching process and finally a tempering process for tempering the tire rasp blade. The austenitising process is performed by using induction heating for heating of said tire rasp blade.

An apparatus for performing induction heating comprises an induction coil, e.g. made of cobber, which is energised with a radio-frequency electric current. This generates a high-frequency electromagnetic field that acts on the rasp blade. This results in a heating effect. By using induction heating, tests have surprisingly shown that the durability of a rasp blade is significantly increased by 30-50%. This increase could be because induction heating is a very fast heating method (austenitisation temperature can be reached within 15 seconds), wherein energy is focused into the rasp blade and the austenitisation temperature can be reached quite fast throughout the entire rasp blade. Thereby, the structure in the rasp blade is transformed in a different manner than when heated in an oven. The structure of the rasp blade after austenitisation becomes fine-grained, thereby allowing sufficient ductility and more hardness.

Alternatives to induction heating could possibly be other heating techniques being fast in a similar manner, such as using a gas flame directed towards the rasp blade or using a heated salt bath into which the rasp blade is inserted.

In an embodiment, the main part of the rasp blade comprises the teeth. The hardening is most important to these parts since these parts are in contact with the tire during operation.

In an embodiment, the tire rasp blade is quenched immediately after the austenitising process.

In an embodiment, the austenitising process comprises maintaining the austenitisation temperature in a time interval shorter than 10 seconds, preferably shorter than 5 seconds and more preferably shorter than 2 seconds.

In an embodiment, the complete austenitising process is performed in less than 30 seconds, preferably less than 20 seconds and more preferably less than 10 seconds.

In an embodiment, the rasp blade is fixated at a transporting device during shaping, hardening and tempering and wherein said austenitising is performed while the tire rasp blade is maintained fixated in said transporting device. Thereby, during production, the rasp blade can be fixated after shaping during austenitising, quenching and tempering, and the process can be made automatic.

Further, the present invention relates to a tire rasp blade for mounting on a rasp hub, said tire rasp blade comprising a blade body and blade teeth and said tire rasp blade having been produced according to the method described above.

BRIEF DESCRIPTION OF DRAWINGS

The invention is explained in detail below with reference to the drawings, in which.

DETAILED DESCRIPTION OF DRAWINGS

Figure 1:
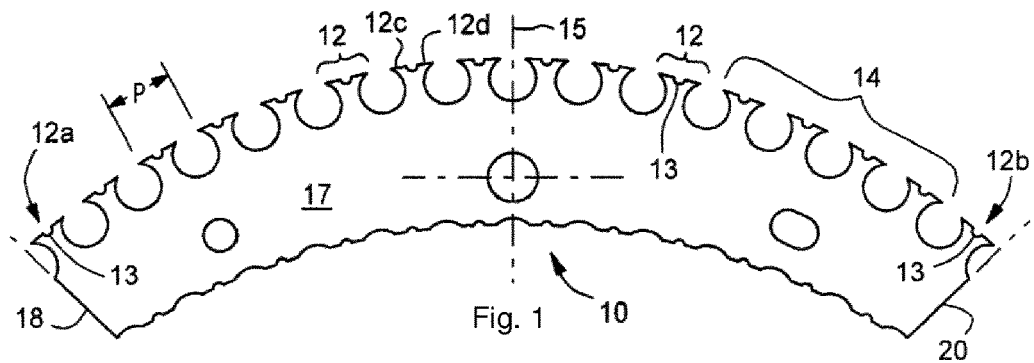
FIG. 1 illustrates a tire rasp blade.

FIG. 1 illustrates a tire rasp blade, which will be described in the following. The rasp blade 10 is formed in a quadrant or arcuate shape, i.e. it extends around approximately one quarter, one fifth or one sixth of a cylindrical hub. The blades may be perpendicular to the axis of rotation of the hub, or they may be slightly skewed (e.g. by 3-5 degrees) relative to perpendicular. Moreover, alternate stacks may be skewed in opposing directions (i.e. one toward one end of the rasp hub, the next toward the other hub end). The set of teeth 12 are uniformly distributed along a working edge 14 of the blade 10 and have a predetermined pitch. The pitch is the distance from the leading edge of one tooth to the leading edge of the next adjacent as illustrated at P in FIG. 1. A first tooth 12a is closest to a first end 18 of the blade 17. A second tooth 12b is closest to the other end 20 of the blade 17, which is furthest from the reference end 18. The centers of the teeth 12a, 12b (i.e. the middle of the notch 13 separating the two individual teeth sections 12c, 12d formed by the notch) are located at the same distance from each respective ends 18, 20 so that the set of teeth 12 are symmetrically disposed relative to the center 15 and the ends 18, 20 of the blade body 17.

The teeth 12 are twisted so that one individual section 12c formed by the notch 13 is displaced to one side of the blade body 17, and the other tooth section 12d is displaced to the other side of the blade body 17 thus providing the two individual tooth sections 12c, 12d, and two leading cutting edges for each dovetail tooth 12. In a rasp hub, on which a plurality of the rasp blades 10 are mounted in stacks of four, five or six separate parallel arrays with alternate stacks slightly inclined in opposing directions relative to a plane perpendicular to the axis of rotation of the hub, each of the spaced apart blades of the stack has their respective sets of teeth 12 lined up substantially horizontally or vertically in use.

Figure 2A:
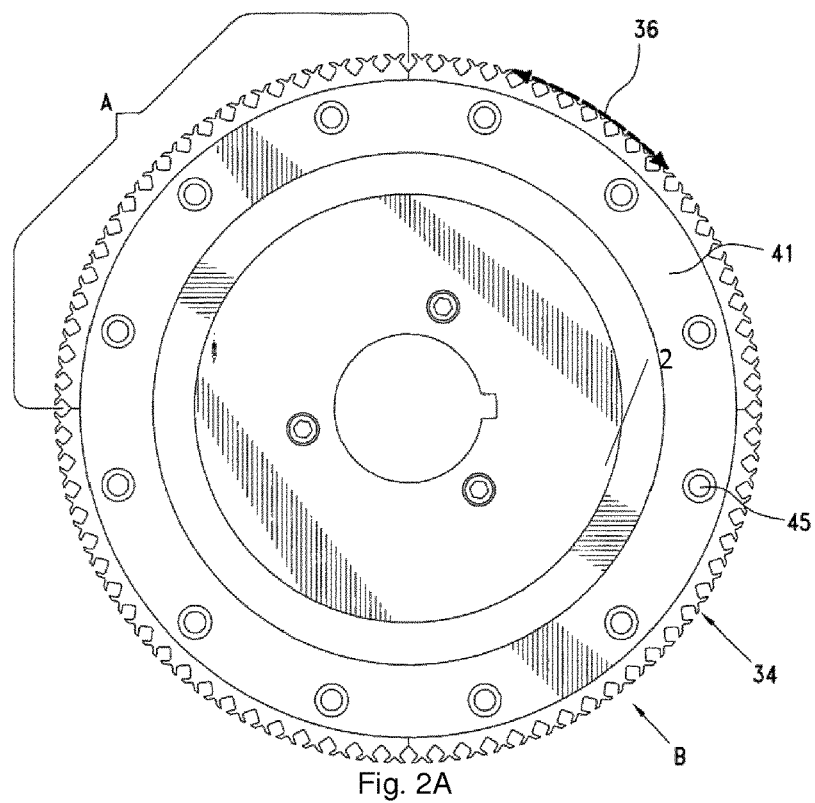
FIG. 2A illustrates a side view of a tire rasp blade hub.
Figure 2B:
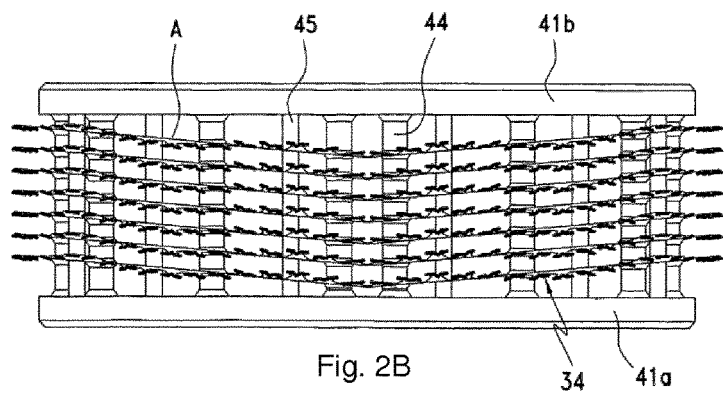
FIG. 2B illustrates a top view of the rasp blade hub.

FIG. 2A illustrates a top view of a tire rasp blade hub including four rasp blades A (identified by a bracket) positioned on pins 45. In FIG. 2B, a side view of the rasp blade hub is shown with multiple rasp blades A mounted on pins 45. The rasp blades are mounted at an angle relative to the direction of rotation of the rasp hub 41. The detailed mounting configuration of the rasp blades A on the rasp hub 41a is shown in FIG. 2B.

When the hub assembly B is mounted to the buffing machine (not shown), the blades A may be presented to the worn tire in a vertical configuration or a horizontal configuration. As the hub assembly B rotates, the cutting edge 36 of each blade A is brought into contact with the tread of the worn tire. Because the plurality of pairs of cutting teeth 34 of each blade A are disposed in a wave-like configuration, and in a non-planar configuration relative to the planar body 38, when the blade A sweeps against the worn tire, the cutting teeth 34 contact and remove tread from a broad area of the worn tire equal to the lateral distance or amplitude between the tooth furthest above the plane of the planar body 38 and the tooth furthest below the plane of the planar body 38.

Other rasp blade hubs use spacers between blades being designed for use with rasp blades having planar bodies.

Figure 3A:
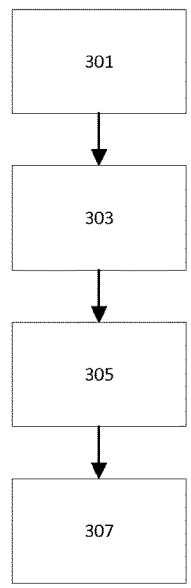
FIG. 3A is a diagram illustrating the steps in producing a tire rasp according to the present invention.

FIG. 3A is a diagram illustrating the steps in producing a tire rasp according to the present invention.

Initially in 301, a shaping process is performed, where the rasp blades are produced, the rasp blades are e.g. produced from steel plates e.g. delivered as coils, where the plates have been rolled as coils for easy handling and transport. The steel plates are fed to a punching press machine, where the rasp blades are shaped by a punching press to include both blade teeth and a blade body.

Next in 303, an austenitising process is performed, and in this process, the shaped rasp blades are austenitisied by heating them to obtain an austenitisation temperature, which could be a temperature above 880 degrees Celsius in one embodiment.

In 305 and as soon as the entire material of the rasp blade has reached the austenitisation temperature, the rasp blade is cooled and in order to cool the rasp blade quickly to a low temperature, the rasp blade is quenched e.g. by dipping or spraying it into or with a cooling media. Hardness has now been achieved for the rasp blade. A method of identifying the temperature could be based on the colour of the hot rasp blade.

In 307, a tempering process is performed, where the rasp blade is tempered by heating it to a tempering temperature.

Finally, the blades are slowly cooled down e.g. by air-cooling and then they are ready for use.

Figure 3B:
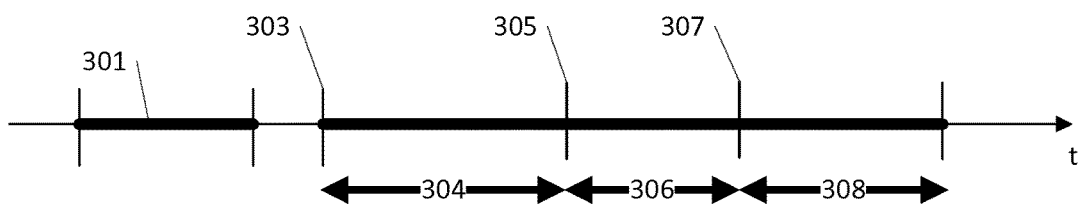
FIG. 3B illustrates an embodiment of the timing when producing a tire rasp blade.

In FIG. 3B, an embodiment of the timing of each process described in connection with FIG. 3A is illustrated along a time axis with time marked as t. It is illustrated that the initial process is the shaping process 301, and the next initiated process is the austenitising process 303, which is performed within a time interval 304. Immediately after the austenitising process, quenching 305 is initiated, and this is performed within a time interval 306. Finally, the tempering process 307 is initiated, and this is performed within a time interval 308. The time intervals are not to be interpreted as indicative of the relative time interval used for each of the processes, but just to indicate that there is a time interval for each process, which will be described below.

The austenitising process is performed using a fast heating technique to ensure a short time interval 304 for the austenitising process, where the rasp blade is heated to an austenitisation temperature in this time interval 304.

Figure 3C:
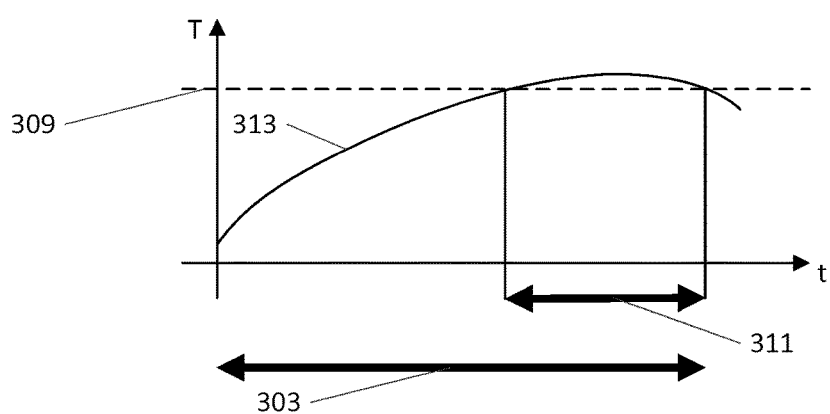
FIG. 3C illustrates the temperature of the tire rasp blade during the austenitising process.
Figure 4A:
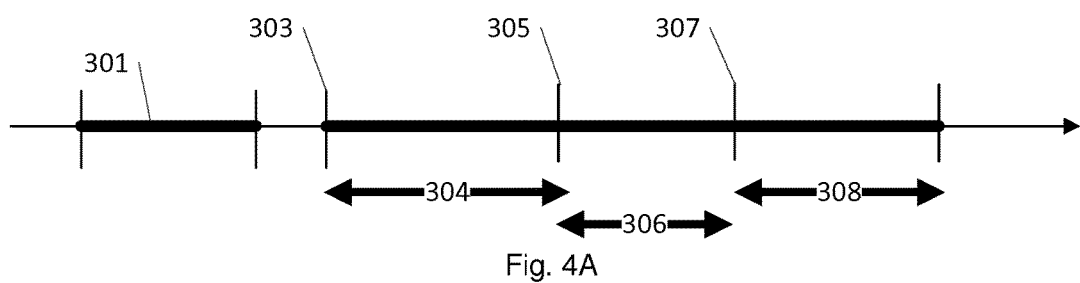
FIG. 4A illustrates an alternative embodiment of the timing when producing a tire rasp blade.

In an embodiment, the austenitising process heats the shaped rasp blade from a room temperature of e.g. 20 degrees Celsius to 880 degrees Celsius. The rasp blade is heated by induction heating, where electromagnetic energy is directed into the rasp blade and converted to heat. This technique is good since it also ensures that heat is distributed throughout the complete rasp blade. When using induction heating for heating the relatively thin rasp blades, it is important to orient the induction coils of the induction heating system in a direction, whereby the coils does not induction heat each other, which would damage the induction heating system. In FIG. 3C, the austenitising process is illustrated by illustrating the temperature (T) of the rasp blade as a function of time (t). The curve 313 illustrates the temperature of the rasp blade and how the temperature increases to the austenitisation temperature marked with the dotted line 309. When this temperature is reached, it is maintained for a short time period 311 to ensure that the complete rasp blade structure has obtained the austenitisation temperature. After this, quenching is initiated for quickly cooling the rasp blade. In FIG. 4A, an alternative embodiment of the timing of each process described in connection with FIG. 3A is illustrated along a time axis with time marked as t. Similar to FIG. 3B, the initial process is the shaping process 301, and the next initiated process is the austenitising process 303, which is performed within a time interval 304.

In this embodiment, quenching is initiated 305 shortly overlapping the austenitising process, and this is performed within a time interval 306. The overlap is to ensure that the temperature of the rasp blade does not become too high and that the rasp blade is cooled immediately after the austenitising temperature is reached. By having this overlap, it can be ensured that the temperature does not exceed the austenitisation temperature, but only reaches the temperature and immediately the temperature is lowered by quenching.

Finally and similar to FIG. 3B, after quenching the tempering process 307 is initiated, and this is performed within a time interval 308. Similar to FIG. 3B, the time intervals are not to be interpreted as indicative of the relative time interval used for each of the processes, but just to indicate that there is a time interval for each process, which will be described below.

Figure 4B:
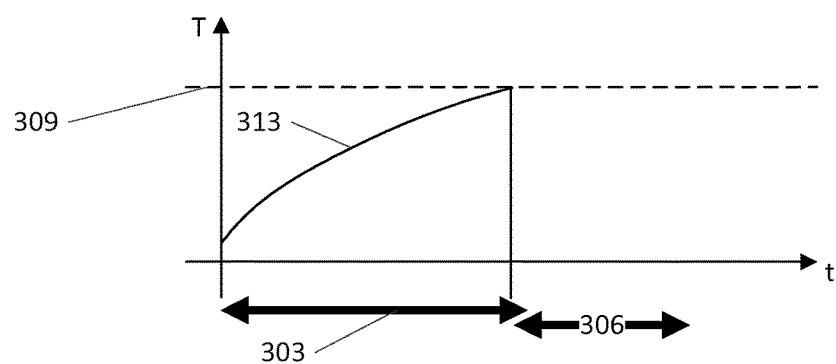
FIG. 4B illustrates the temperature of the tire rasp blade during the austenitising process with timing according to FIG. 4A.

In FIG. 4B, this alternative austenitising process is illustrated by showing the temperature (T) of the rasp blade as a function of time (t). The curve 313 illustrates the temperature of the rasp blade and how the temperature increases to the austenitisation temperature marked with the dotted line 309. Slightly before this temperature is reached, quenching is initiated for quickly cooling the rasp blade, thereby avoiding that the temperature of the rasp blade gets too high, which may reduce the properties of the rasp blade. In an embodiment, the quenching process overlaps the austenitising process with 10 to 20 milliseconds.

After the shaping process is performed, the punched rasp blades are positioned in the transportation device, which in an alternative embodiment may also be a fixation device, which holds the rasp blade during the austenitisation, quenching and tempering process. The heating of the blades, which are performed during austenitisation, is via induction coils being mounted and directed in a manner around the fixation device, whereby the induction coils heat the rasp blade without heating the other coils or at least with a minimal heating of the other coils.

The invention claimed is:

1. A method for producing a tire rasp blade for mounting on a rasp hub, the tire rasp blade comprising a blade body and blade teeth, wherein the method comprises:
   induction heating at least the blade teeth of the tire rasp blade to an austenitization temperature; and
   tempering the tire rasp blade by starting quenching of the tire rasp blade before stopping the induction heating of at least the blade teeth of the tire rasp blade.

2. A method according to claim 1, wherein the austenitization temperature is at a temperature above 880 degrees Celsius and the quenching is started to ensure that the austenitization temperature is not exceeded.

3. A method according to claim 1, wherein the induction heating is performed by a number of induction coils, and wherein the induction coils are oriented to minimize induction heating of neighboring induction coils.

4. A method according to claim 1, wherein the main part of the rasp blade comprises the blade teeth.

5. A method according to claim 1, wherein the induction heating and quenching is performed in less than 30 seconds.

6. A method according to claim 5, wherein the induction heating and quenching is performed in less than 20 seconds.

7. A method according to claim 5, wherein the induction heating and quenching is performed in less than 10 seconds.

8. A method according to claim 1, wherein the rasp blade is fixated at a transporting device during shaping and tempering and wherein the austenitization is performed while the tire rasp blade is maintained fixated in the transporting device.

* * * * *